United States Patent [19]

Greenman et al.

[11] 3,978,943

[45] Sept. 7, 1976

[54] FOLDING SUPPORT BRACKET

[76] Inventors: James R. Greenman, 5185 Silver Pines Road; Philip J. Pelky, 9600 Peninsular Drive, both of Traverse City, Mich. 49684

[22] Filed: July 7, 1975

[21] Appl. No.: 593,645

[52] U.S. Cl. .............................. 182/155; 182/186; 182/226

[51] Int. Cl.[2] .............................. F16M 11/00

[58] Field of Search ........... 182/155, 153, 186, 185, 182/184, 183, 182, 181, 226, 225, 224; 248/239, 166, 168, 170; 108/131, 121, 129; 16/146, 128

[56] References Cited

UNITED STATES PATENTS

| | | | |
|---|---|---|---|
| 1,656,558 | 1/1928 | Dysinger | 182/155 |
| 1,881,755 | 10/1932 | Logan | 182/186 |
| 2,824,719 | 2/1958 | Nutting | 182/155 |

*Primary Examiner*—Reinaldo P. Machado
*Attorney, Agent, or Firm*—Price, Heneveld, Huizenga & Cooper

[57] ABSTRACT

The specification discloses a bracket assembly for supporting a pair of legs on either side of a beam to form a collapsible sawhorse, barricade, or the like in which the legs can be pivoted between folded and upright positions. The assembly includes a beam support bracket, for supporting a beam, and a pair of leg support brackets each pivotally interconnected to one side of the beam support bracket by a swivel bracket. Means are included for positioning each swivel and leg bracket unit in an upright position, for restraining outward flexing of said swivel brackets in the upright position, and for preventing pivotal movement of said swivel and leg bracket units out of the upright position when the leg brackets engage the beam support bracket.

21 Claims, 5 Drawing Figures

FOLDING SUPPORT BRACKET

BACKGROUND OF THE INVENTION

This invention relates to collapsible sawhorses, barricades, or the like of the type including an elongated beam and at least one pair of legs, one leg supported on either side of the beam. More particularly, the invention relates to a bracket assembly for pivotally securing said legs to such a beam such that they may be moved between a folded position and a strong, secure, and stable upright position.

A dominant problem in the use of sawhorses, barricades for highway construction, or the like is the amount of space required to store and transport such sawhorses and barricades when not in use. Accordingly, foldable or collapsible sawhorses and barricades have become widely known. A common problem with such collapsible structures is the stability of the structure when in use. Thus, many of the prior known structures are prone to wobble or yield somewhat when a force is applied to them or a weight is supported on them.

In order to overcome the stability problem, structures have been proposed which are greatly reinforced but are therefore heavy, bulky, and expensive. Typically, such reinforced structures have included braces extending between the legs of the horse or barricade, at least in the extended position, at a position spaced below the location of the upper beam or main support between the legs. Additionally, the prior known structures because of the additional reinforcing structure included therein cannot be folded into a neat, compact package for storage or transportation. In an attempt to avoid the above problems, other prior known structures have been manufactured as a complete unit including a central beam, at least one pair of legs, and means for interconnecting the legs to the beam. The requirement of an entire unit, however, makes replacement of a single component of the unit difficult and expensive if such component becomes damaged, worn out, or the like.

The present invention overcomes all of the above problems and provides an inexpensive, reliable, and stable sawhorse or barricade which may be folded for storage or transportation and extended for use. The invention allows substitution of different central beams and leg members, is extremely rigid and durable, and yet may be folded to a compact, neat package requiring only a minimum of space for storage or transportation.

SUMMARY OF THE INVENTION

In its broader aspects, the invention is a stable, durable bracket assembly having a beam support bracket adapted to be secured to a support beam and a pair of leg brackets on either side of the beam support bracket and pivotally secured to that bracket. Eaach leg bracket is adapted to receive a leg member which may be moved between a folded and extended position by means of the leg bracket. The assembly, in fact, becomes more stable with an increase in force or weight applied to a beam supported by the bracket assembly.

Unique stop means are included on the beam support bracket for limiting pivotal movement of each of the leg brackets in its upright position. The stop means also includes restraining means spaced apart from the points at which the leg brackets are pivotally secured to the beam support bracket to prevent outward movement or flexing of the leg brackets away from the central beam support bracket. In the preferred embodiment, the stop means and restraining means comprise a generally L-shaped member extending laterally outwardly of either side of the beam support bracket.

In another aspect of the invention, the bracket assembly includes engaging means extending between each of the leg brackets and the beam support bracket for preventing unexpected, undesired folding of the assembly. In the preferred embodiment, the engaging means comprises cooperating slots or detents in the beam support bracket and ear flanges on the leg brackets.

In other aspects, each leg bracket is pivotally secured to a flange of the beam support bracket by an intermediate swivel bracket with the swivel bracket engaging the stop means and restraining means while the leg brackets include the ear flanges which engage the slots or detents.

These and other objects, advantages, purposes, and features of the invention will become more apparent from a study of the following description taken in conjunction with the drawings.

DESCRIPITON OF THE PREFERRED EMBODIMENT

Figure 1:
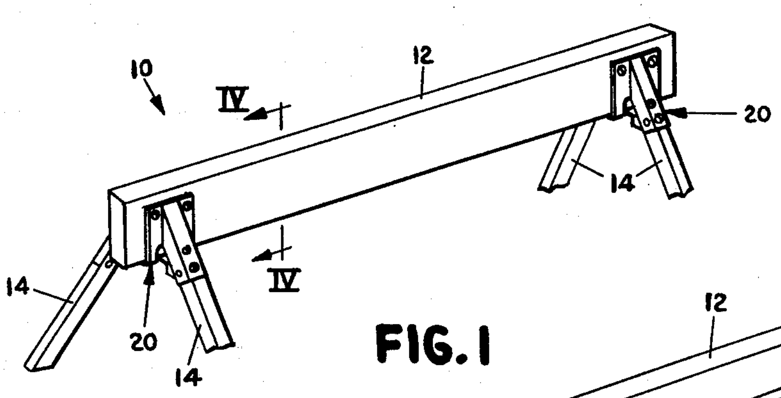
FIG. 1 is a fragmentary, perspective view of a collapsible sawhorse or barricade including a pair of the bracket assemblies of the present invention wherein the legs are pivoted to their upright or extended positions.
Figure 2:
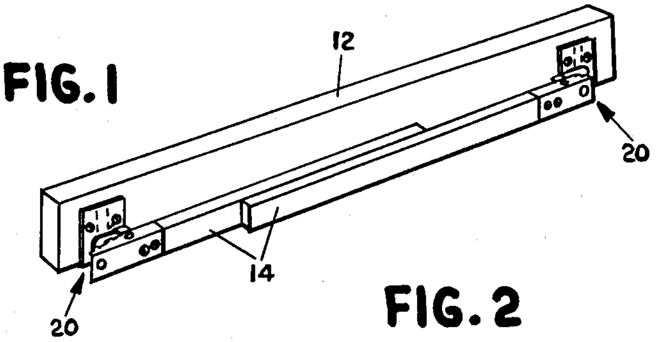
FIG. 2 is a perspective view of the collapsible sawhorse or barricade shown in FIG. 1 with the legs folded.

Referring now to the drawings in greater detail, FIGS. 1 and 2 illustrate a collapsible sawhorse or barricade 10 formed by using two of the present bracket assemblies 20. Sawhorse 10 includes an elongated beam 12 formed from a wooden two-by-four, metal beam, or the like supported by two pair of legs 14 extending outwardly and downwardly from either side of either end of the beam. The beam 12 and each pair of legs 14 are joined together by one of the bracket assemblies 20 shown in greater detail in FIGS. 3–5. As illustrated in FIG. 1, the legs may be pivoted or rotated to an upright, extended position in which they extend in a plane generally transverse to the axis of extension of the beam 12. The legs also may be rotated or pivoted to a folded position in which they extend toward one another and generally parallel to the beam 12 for ease of storage and transportation as shown in FIG. 2. The legs 14 may be tapered to facilitate compact folding alongside the beam. Alternately, a single bracket assembly 20 may be used to support one portion of beam 12 with the beam angling downwardly into contact with the supporting surface.

Figure 3:
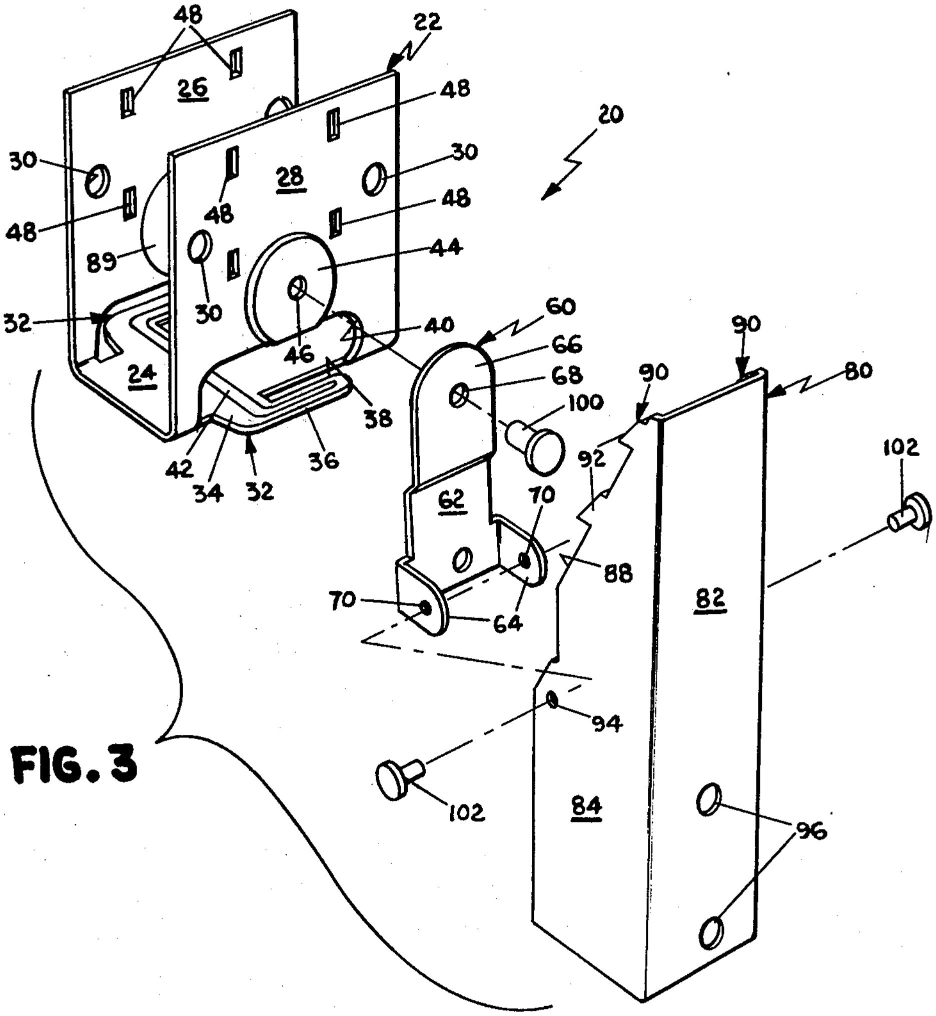
FIG. 3 is a perspective, exploded view of the bracket assembly of the present invention.
Figure 4:
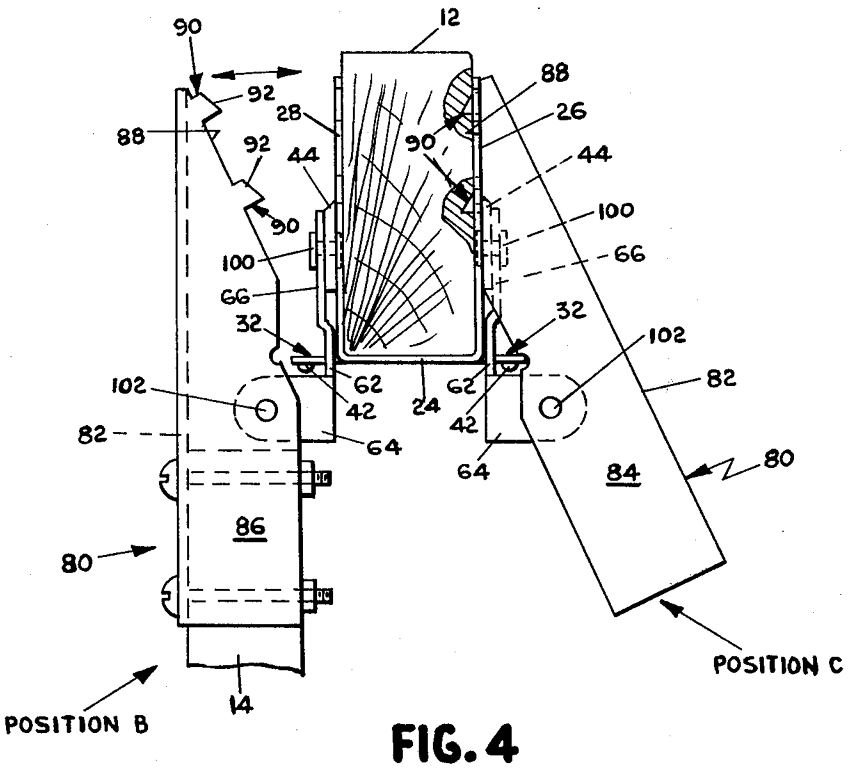
FIG. 4 is an end elevation of one of the bracket assemblies of the present invention taken in section through the beam supported thereby along plane IV—IV of FIGS. 1.
Figure 5:
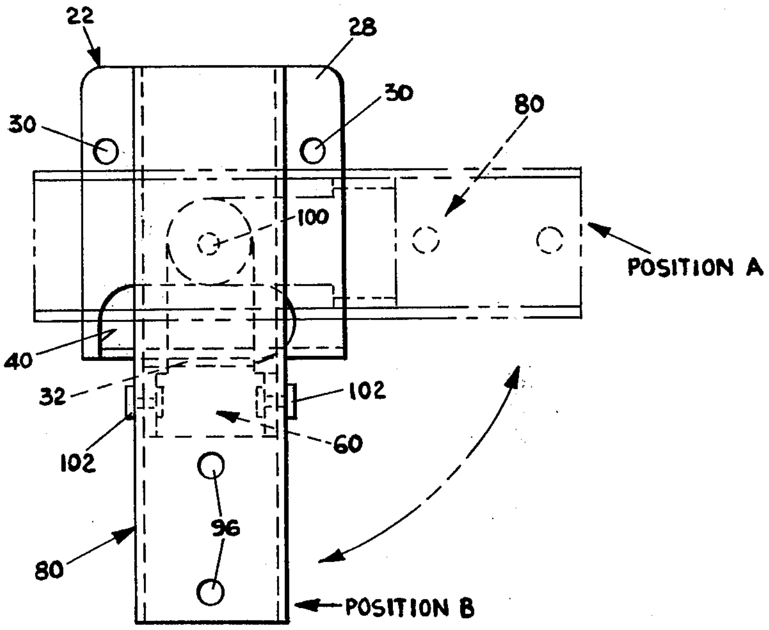
FIG. 5 is a side elevation of the bracket assembly shown in FIGS. 1–4.

Referring to FIGS. 3–5, each bracket assembly 20 of the present invention preferably includes a beam support bracket 22, a pair of identical leg brackets 80, and a pair of identical swivel brackets 60. Each of the swivel brackets 60 is pivotally secured to one side of the beam support bracket 22 intermediate that central bracket and one of the leg brackets 80. Each leg bracket is pivotally secured to one of the swivel brackets.

As is best seen in FIGS. 3 and 4, the beam support bracket 22 includes a generally planar base 24 and a pair of spaced, generally planar side flanges 26, 28 extending generally upwardly from either edge of the base. Typically, bracket 22 is stamped from sheet steel and thereby formed integrally in one piece. Side flanges 26, 28 are generally parallel to one another and, together with base 24, define an upwardly opening, generally U-shaped receptacle which receives beam 12 therein. A pair of holes 30 in each side flange is provided for securing the beam within the bracket 22 by appropriate screws or the like.

Extending laterally outwardly of either side flange 26, 28 from the opposing side edges of base 24 are generally L-shaped flange members 32 each including a short leg 34 and a longer leg 36. Leg 34 extends generally perpendicularly outwardly away from its respective base side edge while leg 36 extends generally perpendicularly to leg 34 and is spaced away from the side edge, and thus the plane of the outside surface of its respective side flange, to form a slot 38. Leg 36 extends generally parallel to the plane of its respective side flange.

Flange members 32 are preferably stamped integrally from the same sheet material used to form bracket 22 as shown in FIG. 3. Thus, L-shaped flange members 32 are stamped out leaving apertures 40 in each of the side flanges 26, 28 (FIG. 3). The L-shaped flange members 32 and the base 24 are strengthened and rigidifed therealong from the ends of arms 36 across the center of the base by a continuous channel or recess 42 which is stamped and offset from the general plane of the L-shaped flange members and base 24 as shown in FIGS. 3 and 4.

Each side flange 26, 28 includes a circular section 44 offset outwardly toward the exterior of the bracket and located immediately above the L-shaped flange members 32 generally in the center portion of each side flange. The offset of sections 44 leaves recesses 89 on the inside surfaces of flanges 26, 28. An aperture 46 is provided in the center of each offset section 44 for pivotably securing one of the swivel brackets 60 thereto. Further, two pair of vertically aligned, generally vertically oriented slots 48 are located in each side flange in the upper portions thereof. Slots 48 receive ear flanges 90 on leg brackets 80 to prevent rotation of the leg brackets and swivel brackets when the leg brackets are in their final erected position and braced against the side flanges.

As seen in FIGS. 3 and 4, swivel brackets 60, which are also typically stamped from sheet steel or other sheet metal, include a back portion 62 and securing flanges 64 extending outwardly in the same direction from either lateral edge of back 62 at opposing, spaced positions on the lower end of the back. The upper end 66 of back section 62 is offset outwardly in the same direction as flanges 64 a distance approximately equal to the distance which sections 44 on flanges 26, 28 are offset from the general plane of those flanges. Hence, when pivotally secured to the side flanges, the swivel brackets 60 will accommodate the offset sections 44 and yet be supported by the remainder of flanges 26, 28 as shown in FIG. 4. End portion 66 of bracket 60 includes an aperture 68 for pivotally securing the bracket to one of the side flanges while securing flanges 64 each include an aperture 70 for pivotally securing one of the leg brackets 80 to the swivel bracket. Apertures 70 are axially aligned with one another to provide a pivot axis for the leg bracket. Brackets 60 are identical with one another and may be interchanged on either side of the beam support bracket 22.

As is also shown in FIGS. 3 and 4, leg brackets 80 are preferably identical channel members including a channel base portion 82 and a pair of spaced channel leg flanges 84, 86 extending parallel to one another and in the same direction from opposite side edges of the base portion 82. The channel members are U-shaped in cross section with the opening to the U-shaped channel extending inwardly toward the central, beam support bracket as shown in FIG. 3.

Each of the channel leg flanges 84 is cut away at the upper portion of the leg bracket at an acute, inclined angle with respect to the back portion 82 to form a pair of inclined edges 88. As shown in FIG. 4, when in their final extended or upright position, leg brackets 80 extend downwardly and at an angle from the beam supporting bracket to the supporting surface of the collapsible sawhorse or barricade with inclined edges 88 braced against side flanges 26, 28.

Ear flanges 90 are formed at spaced intervals along each of the inclined edges 88. Ear flanges 90 are spaced apart along edges 88 at the same interval as each vertically aligned pair of slots 48 such that they will be in registry therewith for insertion into the slots when leg brackets 80 are pivoted to their final erected position as shown in FIG. 4. The outer free edges 92 of each ear flange are cut at an angle to facilitate pivotal insertion into the slots 48. A pair of axially aligned apertures 94 (FIG. 3) are provided, one in each channel leg flanges 84, for pivotal securement of leg brackets 80 to securing flanges 64 of brackets 60. Additionally, two spaced apertures 96 are provided in channel back portion 82 for receipt of a pair of bolts, screws, or the like for securing a leg 14 within the interior of each leg bracket 80.

Each bracket assembly is assembled such that each swivel bracket 60 has its offset end 66 over offset section 44 of one of the side flanges 26, 28 whereby apertures 46 and 68 are in registry. A swivel or pivot pin 100 is inserted through apertures 46, 68 and peened over or otherwise formed with a retaining head in a rivet-like fashion to hold swivel bracket 60 to side flange 26 or 28. As shown in FIG. 4, the peened or formed head portion of the pin 100 is seated in the recess 89 formed by the outwardly offset section 44 such that no projections extend beyond the plane of the inside surface of side flanges 26, 28. Thus, nothing need be cut from elongated beam 12 for insertion in the beam support bracket thereby maintaining structural integrity of the beam.

After swivel brackets 60 are secured in the above manner, a wooden, metal, or other leg 14 having a cross-sectional size approximating the inside dimensions of channel leg bracket 80 is secured in the lower portion of the channel leg bracket slightly below apertures 94 along back portion 82 and between flanges 84, 86 by a pair of screws received through apertures 96 (FIG. 4). Each leg bracket is then positioned with U-shaped channel opening facing inwardly toward the beam support bracket such that leg flanges 84, 86 overlap securing flanges 64 of swivel bracket 60. Apertures 94 are brought into registry with apertures 70 and swivel or pivot pins 102 are inserted therethrough and peened or formed over on the inside surfaces of flanges 64 to retain leg brackets to swivel brackets 60.

In operation, each swivel and leg bracket combination or unit may be swung between the folded position A (shown in phantom in FIG. 5) and the upright position B (shown in FIG. 5 and the left-hand portion of FIG. 4) about pivot pins 100. As each swivel bracket 60, and thus leg bracket 80, is swung downwardly into position B, back portion 62 of each swivel bracket is received in slot 38 between its respective side flange of bracket 22 and the inner edge of leg 36 of L-shaped leg flange 32. The L-shaped leg flange 32 thereby contacts the outer, exterior surface of back section 62 at a distance spaced below the pivot point provided by pin 100 and resists outward flexing of the elongated swivel bracket away from the side flanges. In addition, the inner edge of leg 34 of "L" flange 32 provides a stop or abutment contacting the edge of back portion 62 to precisely and exactly position swivel brackets 60 and thus leg brackets 80 in the upright position B. In the upright position thus positioned, ear flanges 90 are in registry with slots 48.

Once the swivel and leg bracket combinations have been pivoted about pin 100 to position B, leg brackets 80 may be further pivoted about axially aligned pivot pins 102 into position C (right-hand portion of FIG. 4). This is the final erected position of the bracket assembly in which ear flanges 90 are received in slots 48 and prevent rotation of the swivel and leg bracket units about pivot pins 100. Additionally, inclined edges 88 contact the side surfaces of side flanges 26, 28 causing leg brackets 80 to converge toward one another toward the top of the beam support bracket while legs 14, supported in the leg brackets, diverge outwardly and downwardly into contact with a supporting surface.

As shown in FIG. 4, the axes of aligned pivot pins 102 are spaced laterally outwardly of the side surface of side flanges 26, 28 which are contacted by inclined edges 88. This provides a generally triangularly shaped support arrangement. With such arrangement, elongated beam 12 is supported intermediate the pivot axes of pins 102. The application of a force or weight to the top of beam 12 when so supported by bracket 22 forces the pivot axes of pivot pins 102 downwardly. Since the legs 14 retained by the leg brackets are in engagement with positions on a support surface which are spaced even further apart than are the pivot axes of pins 102, the downward urging of the beam urges a rotation of the upper portion of the leg bracket 80 toward the side flanges of the beam support bracket. Hence, the application of force or weight to the beam causes the leg brackets to clamp ever more tightly against the side flanges such that the support for the beam and any weight thereon is made more stronger, secure and stable with the application of that force.

Accordingly, the stability problems of the prior known folding sawhorses or barricades are uniquely overcome with the present invention because the application of a force or weight to the supported beam actually causes the legs to clamp the beam more rigidly and stably as the force or weight is increased. Further, the present invention may be quickly and easily pivoted to a compact folded position in which the legs are generally intermediate the base and top edges of the beam support bracket and extending along the length of the supported beam. The sawhorse or barricade, therefore, need not be disassembled but merely folded to a neat, compact package for storage transportation.

While one form of the invention has been shown and described, other forms will now be apparent to those skilled in the art. Therefore, it will be understood that the embodiment shown in the drawings and described above is merely for illustrative purposes and is not intended to limit the scope of the invention which is defined by the claims which follow.

The embodiments of the invention in which an exclusive property or privilege is claimed are defined as follows:

1. Apparatus for supporting a pair of legs on a beam to form a collapsible sawhorse, barricade, or the like comprising:

a beam support bracket for engaging and supporting a beam, said beam support bracket including a base having a pair of spaced, side flanges extending generally in the same direction from said base;

a pair of leg brackets, each of said leg brackets adapted to engage and support a leg member; and a pair of swivel brackets each including first securing means for pivotally securing said swivel bracket to one of said side flanges and second securing means for pivotally securing one of said leg brackets to said swivel bracket; said first securing means allowing each of said swivel and leg bracket combinations to be pivoted as a unit between a folded position in which they are generally transverse to said beam support bracket and extend along the sides of said beam support bracket wherein any leg members in said leg brackets are generally parallel to a beam when such a beam is secured in said beam support bracket and an upright position in which said leg brackets extend generally transverse to a beam when such a beam is secured in said beam support bracket; said second securing means allowing said leg brackets to be pivoted into a final position in which they are braced against said side flanges; and stop means on said beam support bracket for limiting pivotal movement of each of said swivel brackets about said first securing means to position said swivel and leg bracket units in said upright position, said stop means including restraining means spaced apart from said first securing means for preventing movement of said swivel brackets outwardly away from said beam support brackets when said swivel and leg bracket units are in said upright position.

2. The apparatus of claim 1 wherein said stop means include flange means extending laterally outwardly of both said side flanges, said flange means including slot means open on one end for receiving said swivel brackets when said leg brackets are in said upright positions.

3. The apparatus of claim 2 wherein said flange means include a pair of generally L-shaped members, extending laterally outwardly adjacent said base, one leg of each of said members extending perpendicularly outwardly from said base support bracket and forming a stop for engaging said swivel bracket in said upright position, said restraining means including the other leg of each of said L-shaped members which extends perpendicularly to said one leg and generally parallel to and spaced apart from its adjacent side flange to form said slot means for engaging said swivel bracket on the side opposite its respective side flange to restrain outward flexing of said swivel bracket.

4. The apparatus of claim 3 wherein said L-shaped members are generally planar, and include an offset section extending therealong to rigidify and strengthen said members.

5. The apparatus of claim 1 wherein said restraining means include a pair of rigid members, each rigid member extending from said beam support bracket laterally beyond the plane including the side surface of one of said side flanges around one edge of said swivel bracket and engaging one of said swivel brackets on its side surface opposite said beam support bracket when in said upright position to restrain outward flexing of said swivel brackets.

6. The apparatus of claim 5 including engaging means extending between each of said leg brackets and one of said side flanges for preventing pivotal movement of said swivel and leg bracket units about said first securing means when said leg brackets are in said final position.

7. The apparatus of claim 4 including engaging means extending between each of said leg brackets and one of said side flanges for preventing pivotal movement of said swivel and leg bracket units about said first securing means when said leg brackets are in said final position.

8. The apparatus of claim 2 wherein said engaging means include at least one slot in each side flange and an ear flange projecting toward each of said side flange from each leg bracket and corresponding in size to said slot, said ear flange being positioned in registry with said slot when said swivel and leg brackets are pivoted to their upright position on said first securing means and being received in said slot when said leg bracket is in its final position.

9. The apparatus of claim 8 including a plurality of said slots in each side flange and a plurality of said ear flanges on each leg bracket, each ear flange adapted to be received in one of said slots.

10. The apparatus of claim 9 wherein said leg brackets each include an inclined surface for contacting said side flanges whereby said leg members will extend outwardly and downwardly from said beam support bracket when said leg brackets are in said final position; said ear flanges extending outwardly from said inclined surfaces of said leg brackets.

11. The apparatus of claim 1 wherein said side flanges extend generally upwardly from said base of said beam support bracket to define a generally upwardly opening, U-shaped support; said leg brackets each include an inclined surface for contacting said side flanges whereby said leg members will extend outwardly and downwardly from said beam support bracket when said leg brackets are in said final position; said second securing means being spaced outwardly of each of said side flanges such that said leg brackets extend convergingly toward one another and said beam support bracket from said second securing means whereby when a force is exerted generally downwardly against a beam supported by said beam support bracket, the portions of said leg brackets including said inclined surfaces are urged toward said beam support bracket while said restraining means prevent outward flexing of said swivel brackets.

12. The apparatus of claim 1 wherein each of said swivel brackets includes an elongated back section having an aperture forming a portion of said first securing means at one end; said second securing means including a pair of spaced, securing flanges extending outwardly in the same direction from said back section at the other end of said back section.

13. The apparatus of claim 12 wherein each of said leg brackets is a channel member having means for securing a separate leg member thereto, a channel base, and a pair of spaced leg flanges extending in the same direction from said channel base, each of said leg flanges and each of said securing flanges of each swivel bracket including at least one aperture through which a pivot pin is received to form said second securing means.

14. The apparatus of claim 13 wherein said channel member leg brackets each have a generally U-shaped, cross-sectional shape which opens toward its respective swivel bracket and side flange, said leg flanges at the upper portion of each channel member being cut at an inclined angle for engaging said side flanges to position said leg brackets outwardly and downwardly away from said beam support bracket.

15. The apparatus of claim 12 wherein said securing flanges include axially aligned apertures spaced outwardly of said side flanges; at least one pivot pin received through each of said leg brackets and said aligned apertures; said leg brackets each including inclined surfaces above said second securing means for engaging the respective side flanges.

16. The apparatus of claim 12 wherein said side flanges each include an outwardly offset portion having an aperture therethrough; said one end of said swivel brackets being offset an amount corresponding to said offset of said side flange offset portion; a pivot pin received through each of said apertures in each of said side flanges and one end of each of said swivel brackets for pivotally securing said swivel brackets to said side flanges; fastening means on each pivot pin received in the recess on the inside of each side flange formed by each side flange offset portion whereby the inside surface of each side panel includes no projections which would obstruct insertion of a beam member in said beam support bracket.

17. The apparatus of claim 1 in combination with an elongated beam received in said beam support bracket between said side flanges and a pair of separate leg members, each of said leg members being secured to one of said leg brackets.

18. Apparatus for supporting a pair of legs on a beam to form a collapsible sawhorse, barricade, or the like comprising:

a beam support bracket for engaging and supporting a beam, said beam support bracket including means for securing a beam thereto;

a pair of leg brackets, each of said leg brackets adapted to engage and support a leg member and including pivot means for pivotally securing said leg brackets to said beam support bracket; said pivot means allowing each of said leg brackets to be pivoted between a folded position in which any leg member secured to said leg bracket extends generally along a beam when such beam is secured to said beam support bracket and an upright position in which said leg bracket and any leg member is braced by said beam support bracket and extends generally transverse to a beam when such a beam is secured to said beam support bracket; and a pair of rigid, generally L-shaped flange members extending laterally outwardly of either side of said beam support bracket, each of said L-shaped members including one leg extending outwardly from said beam support bracket and forming a stop for engaging at least a portion of the combination of one of said leg brackets and pivot means in said upright position, and another leg extending generally perpendicularly to said one leg and spaced apart from said beam support bracket to form a slot for receiving at least a portion of one of said leg brackets in said upright position, said other leg of said L-shaped member restraining said swivel bracket from flexing outwardly away from said beam support bracket.

19. The apparatus of claim 18 including a detent in said beam support bracket adjacent at least one of said leg brackets in its upright position and ear means for insertion in said detent for preventing pivotal movement of said leg bracket about said pivot means when said leg bracket is in its upright position.

20. Apparatus for supporting a pair of legs on a beam to form a collapsible sawhorse, barricade, or the like comprising:

a beam support bracket for engaging and supporting a beam, said beam support bracket including means for securing a beam thereto;

a pair of leg brackets, each of said leg brackets adapted to engage and support a leg member and including pivot means of independently pivotally securing said leg brackets to said beam support bracket; said pivot means allowing each of said leg brackets to be independently pivoted between a folded position in which any leg member secured to said leg bracket extends generally along a beam when such a beam is secured to said beam support bracket and an upright position in which said leg bracket and any leg member is braced by said beam support bracket and extends generally transverse to a beam when such a beam is secured to said beam support bracket;

at least a pair of spaced slots in said beam support bracket adjacent each of said leg brackets in its upright position and a pair of ear flanges extending toward said beam support bracket from each leg bracket, each ear flange corresponding in size to one of said slots, said ears flanges being received in said slots when said leg brackets are in their upright positions, at least one of said slots and corresponding ear flanges in each pair being spaced closer to said pivot means than the other for increased resistance to collapse when said leg bracket is in said upright position.

21. Apparatus for supporting a pair of legs on a beam to form a collapsible sawhorse, barricade, or the like comprising:

a beam support bracket for engaging and supporting a beam, said beam support bracket including means for securing a beam thereto;

a pair of leg brackets, each of said leg brackets adapted to engage and support a leg member and including pivot means for pivotally securing said leg brackets to said beam supporting bracket; said pivot means allowing each of said leg brackets to be pivoted between a folded position in which any leg member secured to said leg bracket extends generally along a beam when such a beam is secured to said beam support bracket and an upright position in which said leg bracket and any leg member is braced by said beam support bracket and extends generally transverse to a beam when such a beam is secured to said beam support bracket;

at least a pair of spaced slots in said beam support bracket adjacent each of said leg brackets in its upright position and a pair of ear flanges extending toward said beam support bracket from each leg bracket, each ear flange corresponding in size to one of said slots, said ear flanges being received in said slots when said leg brackets are in their upright positions; and stop means on said beam support bracket for limiting pivotal movement of each of said leg brackets about said pivot means to position said leg brackets in said upright position said stop means including restraining means spaced apart from said pivot means for preventing movement of said leg brackets outwardly away from said beam support bracket when said leg brackets are in their upright positions.

* * * * *

UNITED STATES PATENT AND TRADEMARK OFFICE

CERTIFICATE OF CORRECTION

PATENT NO. : 3,978,943

DATED : September 7, 1976

INVENTOR(S) : James R. Greenman and Philip J. Pelky

It is certified that error appears in the above-identified patent and that said Letters Patent are hereby corrected as shown below:

Column 7, line 26, Claim 8;

"2" should be --7--;

Column 7, line 20, Claim 7;

"4" should be --1--;

Column 7, line 28, Claim 8;

"flange" should be --flanges--;

Column 7, line 29, Claim 8;

After "each" insert --respective--.

Signed and Sealed this

*Tenth* Day of *January 1978*

[SEAL]

*Attest:*

RUTH C. MASON
*Attesting Officer*

LUTRELLE F. PARKER
*Acting Commissioner of Patents and Trademarks*